(12) United States Patent
Chiba et al.

(10) Patent No.: US 10,736,033 B2
(45) Date of Patent: Aug. 4, 2020

(54) SECONDARY CELL GROUP CONFIGURATION

(71) Applicant: Nokia Solutions and Networks Oy, Espoo (FI)

(72) Inventors: Tsunehiko Chiba, Saitama (JP); Srinivasan Selvaganapathy, Bangalore (IN); Woonhee Hwang, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 204 days.

(21) Appl. No.: 15/324,050

(22) PCT Filed: Jul. 7, 2014

(86) PCT No.: PCT/EP2014/064419
§ 371 (c)(1),
(2) Date: Jan. 5, 2017

(87) PCT Pub. No.: WO2016/004969
PCT Pub. Date: Jan. 14, 2016

(65) Prior Publication Data
US 2017/0164281 A1 Jun. 8, 2017

(51) Int. Cl.
*H04W 52/02* (2009.01)
*H04W 76/15* (2018.01)
*H04L 5/00* (2006.01)
*H04W 72/04* (2009.01)

(52) U.S. Cl.
CPC ....... *H04W 52/0216* (2013.01); *H04L 5/0032* (2013.01); *H04W 72/0446* (2013.01); *H04W 76/15* (2018.02); *Y02D 70/00* (2018.01); *Y02D 70/1242* (2018.01); *Y02D 70/1262* (2018.01); *Y02D 70/1264* (2018.01);
(Continued)

(58) Field of Classification Search
None
See application file for complete search history.

(56) References Cited

U.S. PATENT DOCUMENTS

| 2012/0093109 A1* | 4/2012 | Dong | H04W 74/008 370/329 |
| 2015/0230236 A1* | 8/2015 | Zeng | H04L 41/0806 370/329 |
| 2015/0334763 A1* | 11/2015 | Park | H04W 28/0278 370/336 |

OTHER PUBLICATIONS

International Search Report and Written Opinion received for corresponding Patent Cooperation Treaty Application No. PCT/EP2014/064419 dated Mar. 10, 2015, 12 pages.
(Continued)

*Primary Examiner* — Chi H Pham
*Assistant Examiner* — Raul Rivas
(74) *Attorney, Agent, or Firm* — Squire Patton Boggs (US) LLP

(57) ABSTRACT

A method of carrying out dual connectivity with a secondary access node and an apparatus is provided. A mode of operation of a user equipment is determined in dependence on the presence of bearers mapped to the secondary access node. Operating in a first mode occurs when it is determined that one or more bearers are mapped to a secondary access node. Operation in a second mode occurs when it is determined that no bearers are mapped to the secondary no access node. The second mode comprises limiting a listening time to a downlink channel from the secondary access node with respect to the first mode.

14 Claims, 8 Drawing Sheets

(52) U.S. Cl.
CPC .......... *Y02D 70/142* (2018.01); *Y02D 70/146* (2018.01); *Y02D 70/23* (2018.01); *Y02D 70/24* (2018.01)

(56) References Cited

OTHER PUBLICATIONS

Sham; "DRB relocation between MCG and SCG", 3GPP Draft; R2-140731 DRB Relocation 3rd Generation Partnership Project (3GPP), vol. RAN WG2 No. Prague, Czech Republic; Feb. 10, 2014-Feb. 14, 2014, Feb. 9, 2014.

Intel Corporation; "MAC layer aspects for dual connectivity", 3GPP Draft; R2-133496, 3rd Generation Partnership Project, vol. RANWG2, No. Ljubljana, Slovenia; Oct. 7, 2013-Oct. 11, 2013, Sep. 28, 2013.

CATT: "Some consideration on functional allocation", 3GPP Draft; R2-133373 Some Consideration on Functional Allocation, 3rd Genration Partnership Project, vol. RAN WG2 No. Ljubljana, Slovenia, Sep. 27, 2013.

"3rd Generation Partnership Project; Technical Specification Group Radio Access Network; Study on Small Cell enhancements for E-UTRA and E-UTRAN; Higher layer aspects (Release 12)". 3GPP Standard; 3GPP TR 36.842, vol. RAN WG2, No. V12.0.0 Jan. 7, 2014.

3rd Generation Partnership Project; Technical Specification Group Radio Access Network; Evolved Universal Terrestrial Radio Access (E-UTRA) and Evolved Universal Terrestrial Radio Access network (E-UTRAN); Overall description; Stage 2 (Release 12). 3GPP Standard; 3GPP TS 36.300. 3rd Generation Partnership Project vol. RAN WG2 No. V12.2.0. Jul. 4, 2014.

\* cited by examiner

SECONDARY CELL GROUP CONFIGURATION

RELATED APPLICATION

This application was originally filed as Patent Cooperation Treaty Application No. PCT/EP2014/064419, filed Jul. 7, 2014.

FIELD

The present application relates to the configuration of secondary cell in dual connectivity and in particular but not exclusively to the configuration of a secondary cell without mapped bearers.

BACKGROUND

A communication system may be seen as a facility that enables communication sessions between two or more nodes such as fixed or mobile communication devices, access points such as nodes, base stations, servers, hosts, machine type servers, routers, and so on. A communication system and compatible communicating devices typically operate in accordance with a given standard or specification which sets out what the various entities associated with the system are permitted to do and how that should be achieved. For example, the standards, specifications and related protocols may define the manner how communication devices shall communicate with the access points, how various aspects of the communications shall be implemented and how the devices and functionalities thereof shall be configured.

An example of cellular communication systems is an architecture that is being standardized by the 3rd Generation Partnership Project (3GPP). A recent development in this field is often referred to as the long-term evolution (LTE) or long-term evolution advanced (LTE advanced) of the Universal Mobile Telecommunications System (UMTS) radio-access technology. In LTE base stations providing the cells are commonly referred to as enhanced NodeBs (eNB). An eNB may provide coverage for an entire cell or similar radio service area.

A user may access the communication system by means of an appropriate communication device. A communication device of a user is often referred to as user device (UE), user device or terminal. A communication device is provided with an appropriate signal receiving and transmitting arrangement for enabling communications with other parties. In wireless systems a communication device typically provides a transceiver station that may communicate with another communication device such as e.g. a base station. A communication device such as a user device (UE) may access a carrier provided by a base station, and transmit and/or receive on the carrier.

Capacity of a communication system may be improved by providing network densification—increasing a number of network nodes and decreasing an average distance between user equipment and network nodes. One method of increasing densification of a network is to provide smaller nodes (for example low power nodes) under the control of more powerful macro nodes. The smaller nodes may provide the network with an increased traffic capacity while the macro nodes may provide service availability for the coverage area.

In dual connectivity, a user equipment may operate in a system having both master nodes and secondary nodes and may carry out simultaneous (dual) communication with a master and a secondary node. The functionality of the master and secondary nodes may be arranged in different ways, for example control signalling may be carried out through the master node while data signalling may be carried out through the secondary node and/or uplink and downlink connectivity may be separated between the master and secondary node.

When a secondary node is added to the user equipment, the user equipment may start to monitor or listen for transmissions from the secondary node. In some cases this may lead to the extra use of resources such as power by the user equipment.

SUMMARY

According to a first aspect, there is provided a method of carrying out dual connectivity with a secondary access node, the method comprising: determining a mode of operation of a user equipment in dependence on the presence of bearers mapped to the secondary access node; operating in a first mode when it is determined that one or more bearers are mapped to a secondary access node; and operating in a second mode when it is determined that no bearers are mapped to the secondary access node; wherein the second mode comprises limiting a listening time to a downlink channel from the secondary access node with respect to the first mode.

The method may further comprise: limiting the use of uplink resources to the secondary access node in the second mode with respect to the first mode. The method may further comprise: limiting the use of the uplink resources to a procedure for updating timing information. The timing information may be a timing advance between the secondary access node and a user equipment. The user equipment and the secondary access node may be connected in response to a first random access procedure being carried out between the secondary access node and a user equipment.

The method may further comprise limiting the listening time to a number of sub-frames after a timing information update request has been transmitted. The number of sub-frames may correspond to a time taken for the secondary access node to estimate the timing information and transmit the timing information to the user equipment. The method may further comprise: sending a timing information update request on an uplink resource reserved for the sending of such a request. The timing information request may comprise a physical uplink control channel channel quality indication. The timing information request may comprise a physical uplink control channel SR. The uplink resource may be time shared between the user equipment and at least one further user equipment.

The method may further comprise: determining a time period for which timing information is valid; and sending the timing information update request before the expiry of the time period. The request may be sent once per time period for which timing information is valid. The method may further comprise: receiving a response to the timing information update request. The response may comprise updated timing information. The response may be a media access control element. The response may comprise an indication that the timing information is unchanged. The response may be a physical downlink control channel format 1A message with a default preamble value indicating that the timing information is unchanged.

The method may further comprise: limiting the listening time to a long discontinuous reception mode. The method may further comprise: initiating a random access procedure to update timing information. The random access procedure may be initiated in response to a trigger from the secondary access node. The trigger may indicate that a period of time for which timing information is valid has expired. The trigger may be a message on the downlink channel comprising a random access preamble. The message may be a physical downlink control channel format 1A message. The method may further comprise: receiving a random access response message comprising updated timing information.

The method may further comprise: storing configuration information associated with the secondary access node forming part of a list of secondary access nodes. The method may further comprise: detecting the secondary access node and carrying out a first random access procedure with the secondary access node; and carrying out dual connectivity with the secondary access node in dependence on the associated configuration information and first random access procedure.

According to a second aspect, there is provided a method for carrying out dual connectivity with a primary access node and an user equipment, the method comprising: determining a mode of operation of a secondary access node in dependence on the presence of bearers mapped to the secondary access node; operating in a first mode when it is determined that one or more bearers are mapped to a secondary access node; and operating in a second mode when it is determined that no bearers are mapped to the secondary access node; wherein the second mode comprises limiting the uplink resources reserved for the user equipment with respect to the first mode.

The uplink resources may be limited to uplink resources used in a procedure for updating timing information. The reservation of the uplink resources may be limited to an uplink resource for a request for updated timing information. The reservation of the uplink resources may be limited to a uplink channel quality indicator. The reservation of the uplink resources may be limited to a uplink channel SR. The uplink resource may be reserved to be time shared between the user equipment and at least one further user equipment.

The method may further comprise: receiving a timing information update request on the reserved uplink resource. The method may further comprise: estimating updated timing information in response to the request. The method may further comprise: sending a response to the timing information update request. The response may comprise the updated timing information. The response may be sent as a media access control element. The response may comprise an indication that the timing information remains unchanged. The response may comprise a physical downlink control channel format 1A message with a default preamble value indicating that the timing information is unchanged.

No uplink resources may be reserved for the user equipment. The method may further comprise: monitoring a period of time for which timing information is valid. The method may further comprise: triggering a random access procedure when it is determined that the user equipment is in an on cycle of a long discontinuous reception mode and that the period of time for which timing information is valid has ended. Triggering a random access procedure may comprise: sending a message comprising a random access preamble to the user equipment on a downlink channel. The message may be a physical downlink control channel format 1A message.

The method may further comprise: receiving a random access request comprising the random access preamble. The message may further comprise: sending a random access response to the user equipment comprising timing information.

According to a third aspect, there is provided an apparatus comprising at least one processor and a memory configured to carrying out dual connectivity with a secondary access node, by: determining a mode of operation of a user equipment in dependence on the presence of bearers mapped to the secondary access node; operating in a first mode when it is determined that one or more bearers are mapped to a secondary access node; and operating in a second mode when it is determined that no bearers are mapped to the secondary access node; wherein the second mode comprises limiting a listening time to a downlink channel from the secondary access node with respect to the first mode.

According to a fourth aspect, there is provided an apparatus comprising at least one processor and a memory configured to carry out dual connectivity with a primary access node and an user equipment by: determining a mode of operation of a secondary access node in dependence on the presence of bearers mapped to the secondary access node; operating in a first mode when it is determined that one or more bearers are mapped to a secondary access node; and operating in a second mode when it is determined that no bearers are mapped to the secondary access node; wherein the second mode comprises limiting the uplink resources reserved for the user equipment with respect to the first mode.

BRIEF DESCRIPTION OF DRAWINGS

Embodiments of the present application will now be described with reference to the following figures in which.

DETAILED DESCRIPTION

Before explaining in detail the exemplifying embodiments, certain general principles of a wireless communication system and mobile communication devices are briefly explained with reference to FIGS. 1 to 3 to assist in understanding the technology underlying the described examples.

In a wireless communication system mobile communication devices or user equipment (UE) 102, 103, 104 are provided wireless access via at least one base station or similar wireless transmitting and/or receiving node or point.

Base stations are typically controlled by at least one appropriate controller apparatus, so as to enable operation thereof and management of mobile communication devices in communication with the base stations. The controller apparatus may be part of the base station and/or provided by a separate entity such as a Radio Network Controller. In FIG. 1 control apparatus 108 and 109 are shown to control the respective macro or master level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

Figure 1:
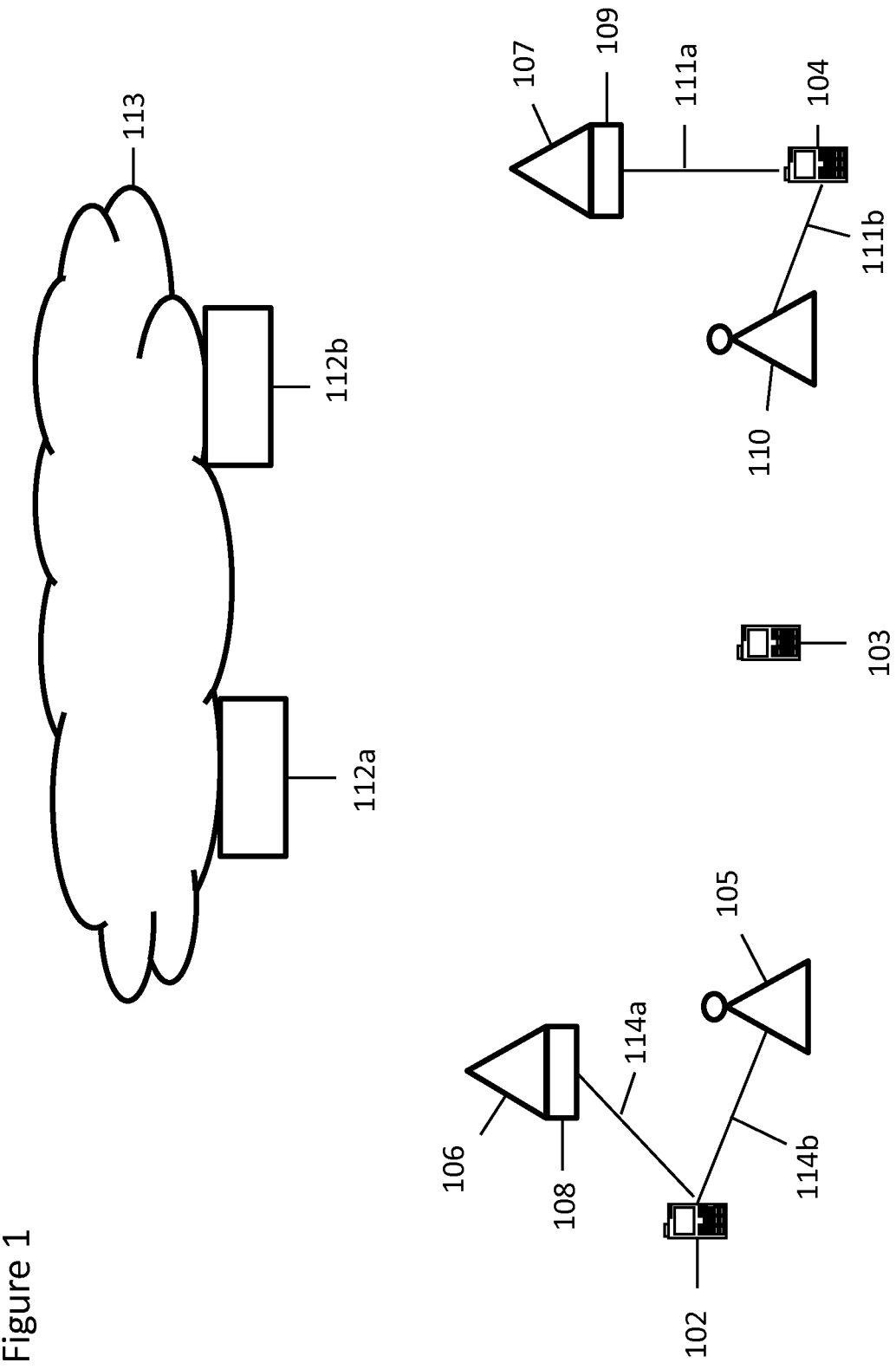
FIG. 1 shows an example of a telecommunications system in which embodiments may be implemented.

In FIG. 1 the master base station 106 is shown as connected to a wider communications network 113 via gateway 112a and the master base station 107 is shown as connected to a wider communications network 113 via gateway 112b. A further gateway function may be provided to connect to another network in some examples.

The smaller or secondary base stations 110 and 105 may also be connected to the network 113, for example via the gateways 112a and 112b and/or via the controllers 108, 109 of the macro level stations 106, 107. In the example, secondary base station 105 may be connected to the network via the controller 108 of the master base station 106 and/or may be connected via the gateway 112a. The secondary base station 110 may be connected to the network via the controller 109 of the master base station 107 and/or may be connected via the gateway 112b. The secondary base stations may for example be provided by a pico cell, a micro cell, and/or the like. It will be appreciated that the secondary base station 105 may for example be coupled to the gateway 112a via the controller 108 or directly to the gateway 112a. The communication system may support the user equipment 102 being in simultaneous communication with the master base station 106 and the second base station 105. Similarly the use equipment 104 may be supported being in simultaneous communication with the secondary base station 110 and the master base station 107. The communication may thus support dual connectivity.

Figure 2:
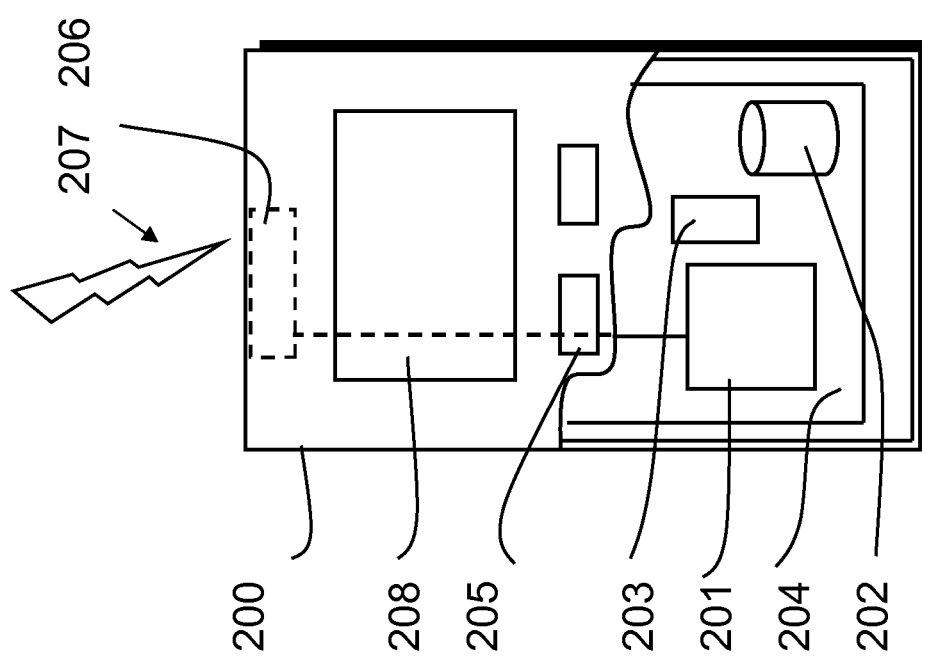
FIG. 2 is a schematic diagram showing an example of a user equipment that may be used in some embodiments.

A possible communication device will now be described in more detail with reference to FIG. 2 showing a schematic, partially sectioned view of a communication device 102. Such a communication device is often referred to as user equipment (UE) or terminal. An appropriate communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The device 102 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the device.

A device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the device by means of a suitable user interface such as key pad 205, voice commands, touch sensitive screen or pad, combinations thereof or the like. A display 208, a speaker and a microphone can be also provided. Furthermore, a communication device may comprise appropriate connectors (either wired or wireless) to other devices and/or for connecting external accessories, for example hands-free equipment, thereto.

The communication devices 102, 103, 104 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Figure 3:
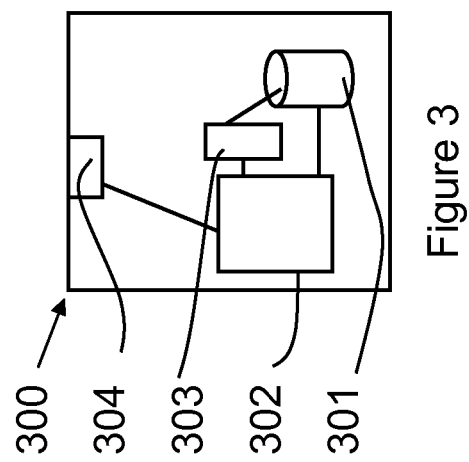
FIG. 3 is a schematic diagram showing an example of an apparatus that may be used in some embodiment.

FIG. 3 shows an example of a control apparatus. The control apparatus comprises at least one memory 301, at least one data processing unit 302, 303 and an input/output interface 304. Via the interface the control apparatus can be coupled to receive and/or transmit data. For example the control apparatus can be configured to execute an appropriate software code to provide the control functions. The control apparatus may be provided in one or more of master base station, a secondary base station and any other suitable control entity.

Figure 4C:
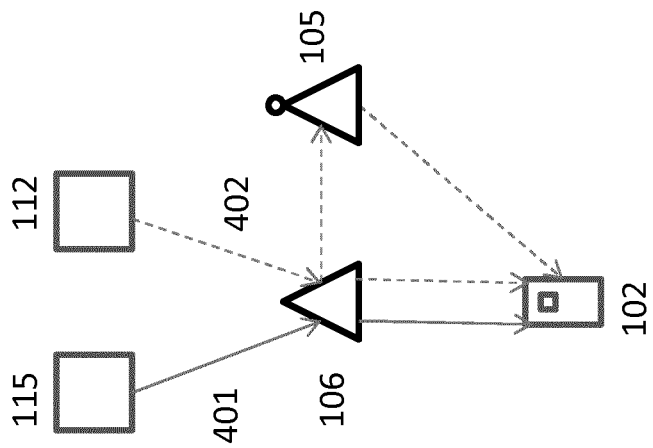
FIGS. 4a, 4b and 4c are schematic diagrams depicting the types of bearers available in dual connectivity.
Figure 4B:
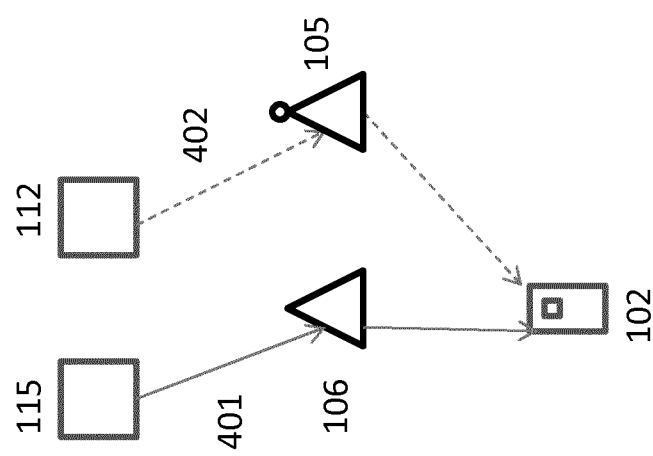
Figure 4A:
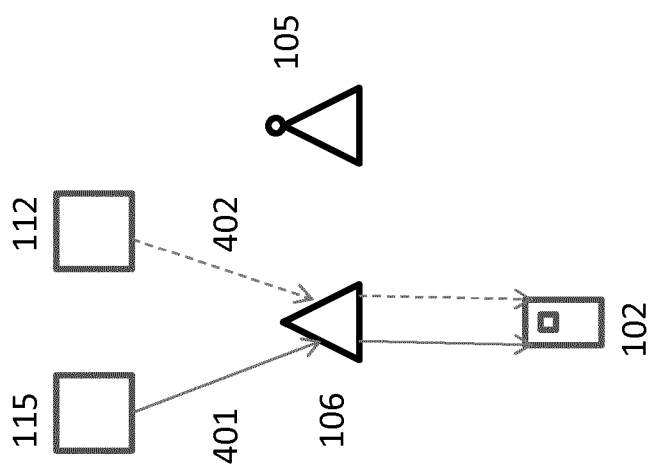

FIGS. 4a to 4c show examples of the three types of bearers that may be used in dual connectivity. The figures depict a gateway 112, a master base station 106, a secondary base station 105 and a user equipment 102. It will be appreciated that in these examples, the master base station 106 may be configured to carry control plane data to and from the user equipment 102 and to and from the gate way 112. Additionally the master base station 106 may be configured to carry control plane data to and from the secondary base station 105. In this case, there may be a S1-MME interface between the master base station 106 and the gateway 112 and an X2-C interface between the master base station 106 and the secondary base station 105.

FIG. 4a shows the case where there are master base station (MeNB) bearers. In this case, control plane data 401 is transferred between the MeNB 106 and a control entity such as a mobility management entity (MME) 115 as well as between the MeNB 106 and the user equipment 102. The user plane data 402 may be provided between a control entity such as a gateway 112 and the MeNB 106 and between the MeNB 106 and the user equipment 102. Thus the bearers carrying the user plane data are MeNB 106 bearers.

FIG. 4b shows a case where the bearers are secondary base station (SeNB) 105 bearers. Similarly to FIG. 4a, control plane data 401 is transferred between the MeNB 106 and the MME 115 as well as between the MeNB 106 and the user equipment 102. User plane data 402 is shown as being provided between the gateway 112 and the SeNB 105 and the SeNB 105 and the user equipment 102. For SeNB bearers a user plane is directly connected between a gateway and a SeNB. It can be seen that in this case, the bearers for carrying user plane data to and from the user equipment are SeNB 105 bearers.

FIG. 4c shows a case where the bearers are split bearers. Similarly to FIGS. 4a and b, control plane data 401 is transferred between the MeNB 106 and the MME 115 as well as between the MeNB 106 and the user equipment 102. User plane data 402 is shown as being provided between the gateway 112 and the MeNB 106, the MeNB 106 and the SeNB 105, the MeNB 106 and the user equipment 102 and the SeNB 105 and the user equipment 102. It can be seen that in this case, the bearers for carrying user plane data to and from the user equipment are split between the MeNB 106 and the SeNB 105. In some embodiments the MME 115 and the gateway 112 may be co-located at a single entity.

When adding a SeNB 105 to a user equipment for communication in accordance with dual connectivity, a MeNB may configure the SeNB and the user equipment for communicating with each other. In this case, the configuration between the SeNB and the user equipment may include bearers that are mapped to the SeNB for carrying user plane data. For example, the MeNB may offload the bearers for a type of user data to the SeNB. In some examples these may be video call or voice over LTE (VoLTE) calls however it will be appreciated that any user data bearers may be mapped to the SeNB. The user equipment may carry out a random access procedure towards the SeNB in order that it may communication with it.

In some existing systems, the SeNB may only be added to the user equipment once it has bearers mapped to it, for example the SeNB may be added only when a call such as a video call is initiated. During the addition of the SeNB, the user equipment and the SeNB are configured for dual connectivity including the configuration of the bearers and the user equipment additionally carried out the random access procedure.

The present disclosure has recognised that the SeNB may be added to the user equipment without having any bearers mapped to it. In embodiments, when a SeNB is added to a user equipment without mapped bearers, the user equipment and SeNB may change their behaviour accordingly. For example, in some embodiments, the user equipment may modify a time spent listening for transmissions from the SeNB. In some embodiments, the communication between the user equipment and the SeNB may be limited to communication for keeping timing information of the user equipment and the SeNB synchronised, for example the communication may be limited to communication for adjusting a timing information, such as a timing advance (TA), of the user equipment. In examples, when a bearer is then subsequently mapped to the SeNB, the user equipment and the SeNB may communicate without having to undergo a random access procedure.

Figure 5:
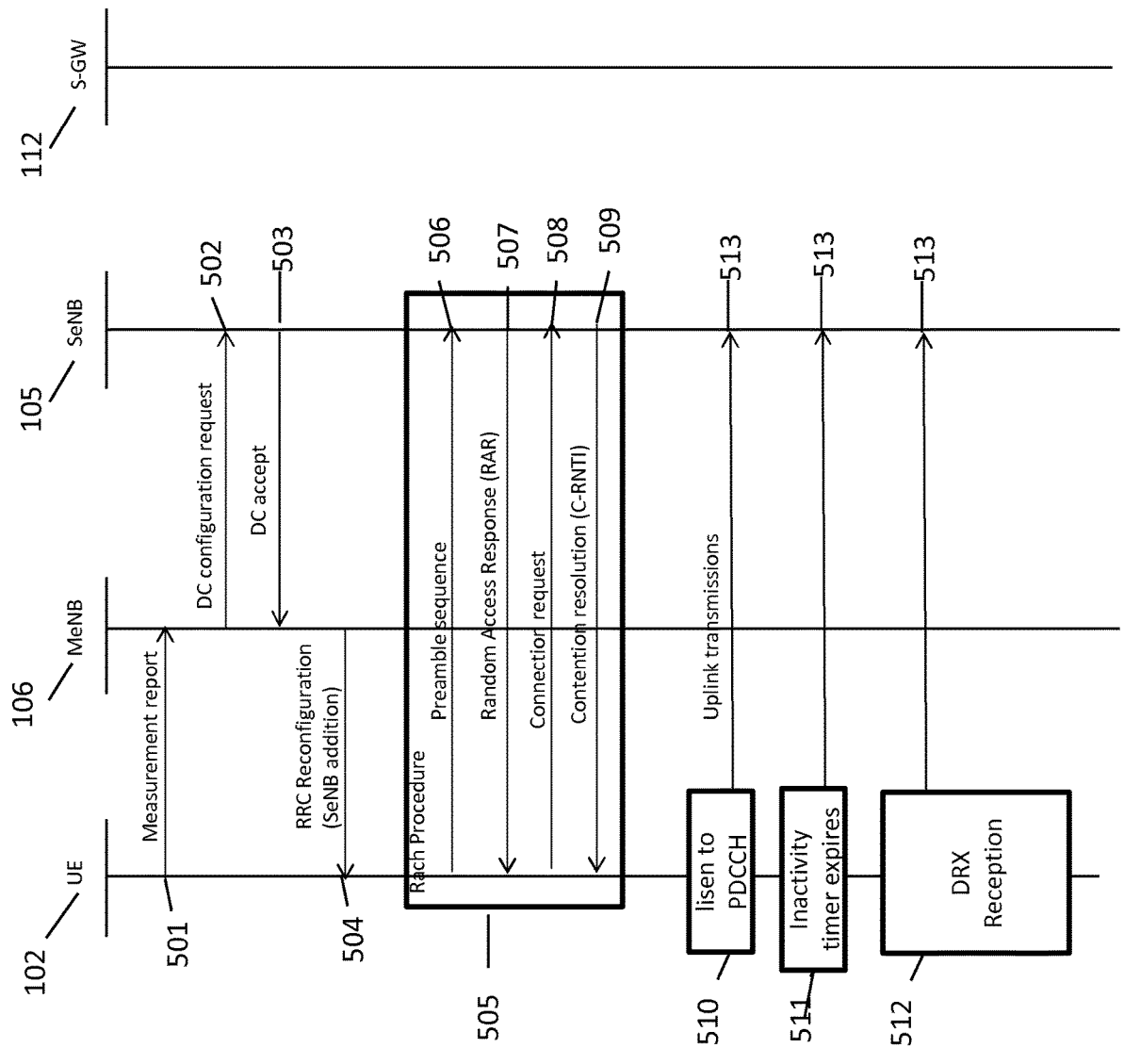
FIG. 5 is a flow diagram showing an example of the method steps that may be carried out when a secondary base station is added to a user equipment.

FIG. 5 is a message flow diagram showing an example of a message flow where a SeNB 105 is added to a user equipment. FIG. 5 shows the user equipment (UE) 102, the MeNB 106, SeNB 105 and gateway (S-GW) 112. At step 501 the UE 102 may send a measurement report to the MeNB 106. It will be appreciated that the UE 102 may generate measurement reports comprising a measurement of signals picked up from surrounding base stations. These reports may be generating periodically, in response to a certain condition met, or in response to a request from the MeNB 106. In one example the UE 102 may measure signals from neighbouring access nodes and report those node for which the signals exceed a threshold. In other words, the UE may report access nodes that are candidates for dual connectivity and/or handover. In some embodiments the MeNB may request a measurement report from the UE 102. The measurement report may contain information allowing the MeNB to select a suitable base station for communication with the UE 102. In the case of FIG. 5, the MeNB 106 may determine (for example based on signalling from the S-GW 112) that a secondary cell or base station supporting one or more secondary cells should be selected. The SeNB 105 may be added to the UE 102.

The MeNB 106 may send a configuration message 502, for example a dual connectivity configuration request, to the SeNB 105 comprising configuration information for communicating with the UE 102. The configuration message may for example include information required for the SeNB 105 to make a decision as to whether it can accept the UE 102 for communication. This information may for example include resources required by the UE. For example, the information may include quality of service (QoS), UE capability and/or MeNB 106 and SeNB 105 configuration. In response to the configuration message 502, the SeNB 105 may respond with a response message 503, for example a dual connectivity accept message. This message 503 may include information to allow the MeNB 106 to configure the UE 102 for communication with the SeNB 105. For example, the response message 503 may comprise SeNB 105 configuration information containing common SeNB configuration and dedicated configuration.

The MeNB 106 may then send a radio resource control (RRC) reconfiguration message 504 to the UE 102. This message 504 may comprise information reconfiguring the UE 102 to communication with the SeNB 105, for example may add the SeNB 105 to the UE 102 and may for example identify the SeNB 105 to the UE 102.

The UE 102 may then initiate a random access (RA) procedure with the SeNB 105 as shown by block 505. This procedure may allow the SeNB 105 and UE 102 to synchronise timings and for the UE 102 to identify itself to the SeNB 105. Steps 506 to 509 are example method steps that may be carried out during the RA procedure 505.

It will be appreciated that while steps 508 and 509 have been shown, these steps may be optional in some embodiments.

The contention resolution messages 508 and 509 may be optional in other examples where the RRC connection reconfiguration message 504 contains dedicated pre-amble info. In dual connectivity however, the message 508 (described below) may inform the SeNB 105 that UE 102 is connected to SeNB. In this case, the purpose of the message 509 may not be contention resolution, but to confirm that the UE 102 is connected to the SeNB 105.

At step 506, the UE 102 may transmit a preamble identifying itself to the SeNB 105 and initiating the RA procedure 505. The SeNB 105 may response with a random access response which may provide a temporary cell radio network temporary identifier (C-RNTI) to the UE 102 as well as resources on which the UE 102 may make a connection request to the SeNB 105. At step 508, the UE 102 may make a connection request to the SeNB 105. At step 509 (also called message 4 of the random access procedure) the SeNB 105 may respond to the connection request 508 by providing the UE 102 with contention resolution including a cell radio network temporary identifier (C-RNTI) for the UE 102. During the random access procedure a physical downlink control channel (PDCCH) and a physical uplink control channel (PUCCH) may be identified to the UE 102 and the timing information, for example a timing advance, may be provided.

At step 510, the UE 102 may start to listen for transmissions on the PDCCH from the SeNB. In some example after the RA procedure 505, the UE 102 may continuously listen for transmission on the PDCCH until the expiry of an inactivity timer. The inactivity timer may determine the amount of time for which the UE 102 should continuously listen before switching to a discontinuous reception (DRX) mode of operation. It will be appreciated that the value of the timer may be determined by the network. After the expiration of the inactivity timer at 511, the UE 102 may switch to a DRX mode 512. In this mode, the UE 102 may listen for transmissions on the PDCCH periodically. The UE 102 may have two DRX modes—a long mode and a short mode. In the short mode, the UE 102 may listen for transmissions more often and in the long mode less often. If no transmissions are received for a period of time when the UE is in the short DRX mode, the UE may switch the long DRX mode.

It will be appreciated that the UE 102, once connected to the SeNB 105 may further transmit information 513 to the SeNB 105. For example the UE 102 may transmit information on the PUCCH relating to cell quality indications (CQI) and/or sounding reference signals (SRS). In other words, even if no user data transmissions are carried out between the UE 102 and the SeNB 105, the UE will still carry out activities relating to keeping the connection between the UE 102 and the SeNB 105 ready for transmission of user data. These transmissions and reception listening periods are useful when one or more bearers have been mapped to the SeNB and there is a feasible chance of receiving scheduling for user data.

In embodiments of the present disclosure, a SeNB may be added to a UE where no bearers have been mapped to the SeNB. For example, the SeNB may be added to the UE prior to a call (such as a video call) being initiated. In this case, if the UE carried out the activities such as the above mentioned activities relating to keeping the connection ready, the UE would be unnecessarily be using battery power as no bearers are available for carrying user data. When a bearer setup is triggered, the MeNB may then map the bearer to the SeNB (that had previously been added to the UE) using a SeNB modification procedure. The MeNB may receive the bearer setup trigger from a higher network entity such as a mobility management entity (MME). The MeNB may determine whether to offload (or map) the bearer to the SeNB.

Embodiments of the present disclosure allow a secondary access node to be added to an user equipment and may take into account the difference in the secondary access node having mapped bearers and not having mapped bearers by introducing two modes of operation for the user equipment and the secondary access node.

A mode of operation can be determined for a user equipment based on whether or not a secondary access node or SeNB has bearers mapped to it or not. The determination may be carried out in response to the SeNB being added to the user equipment or due to some change in the bearer status of the SeNB (for example a bearer being added or removed).

If the SeNB has mapped bearers, the UE may operate in accordance with a first mode. For example in this mode, the UE may continuously listen to a downlink channel from the SeNB until the expiration of an inactivity timer. In this first mode, the SeNB may reserve uplink resources for use by the UE.

If the SeNB had no mapped bearers, then the UE may operate in accordance with a second mode. In the second mode, the time the UE listens to the downlink channel may be limited with respect to the first mode. In other words, the UE may spend less time listening to the downlink channel compared to what it would do in the first mode. The SeNB may reserve less or fewer uplink resources for use by the UE as compared to the first mode. For example, the SeNB may reserve only resources required for the determination of timing information (for example a timing alignment TA) or may reserve no uplink resources for the UE.

In these examples, the SeNB may be added to the UE prior to any bearers being mapped to the SeNB or the SeNB may be kept even after all mapped bearers are removed. In the case that bearers are mapped while UE is in the second mode, operation may swop over to the first mode and the SeNB and UE may start communicating user data without having to go through a full set-up. In the second mode, the UE may carry out limited listening and uplink as there are no bearers mapped to the SeNB.

In examples, the SeNB may operate in accordance with a first mode when bearers are mapped and a second mode when bearers are not mapped. In the first mode, the SeNB may provide a full reservation of uplink resources for the UE. In the second mode, the SeNB may limit the reservation of resources with respect to the first mode. In other words, when no bearers are mapped, the SeNB may reserve fewer resources for the UE than when bearers are mapped. In some cases, this may be only the uplink resources for a timing information update. In some cases, no uplink resources may be reserved for the UE.

Figure 6:
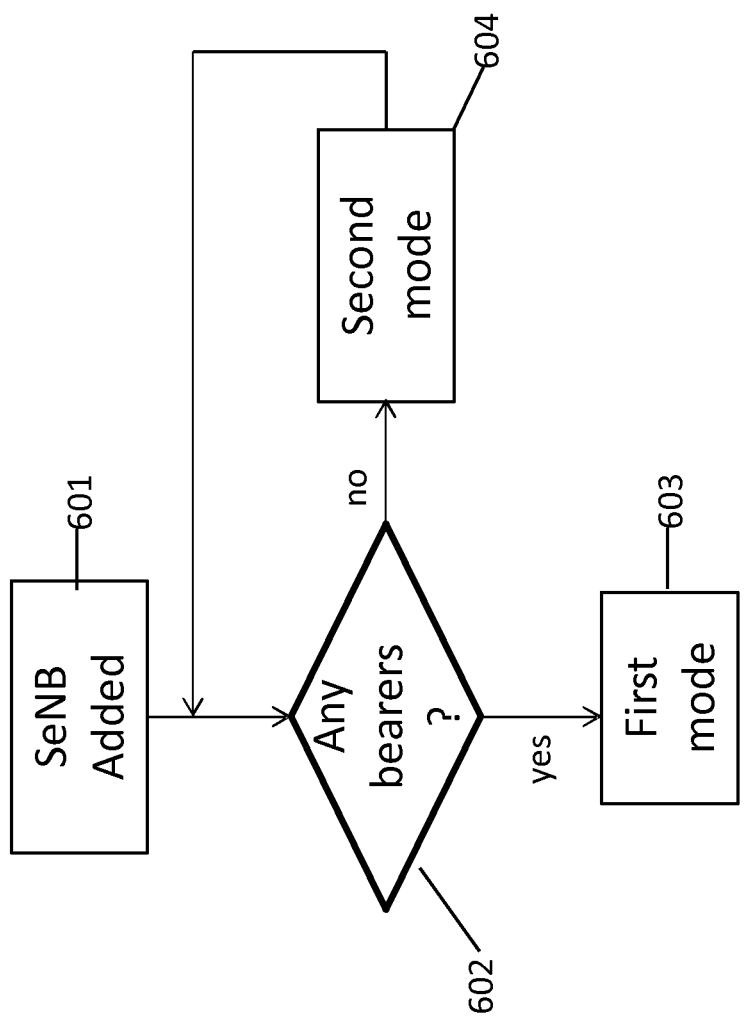
FIG. 6 is a flow diagram showing example method steps with a determining a mode of operation of a user equipment in dependence on the presence of bearers mapped to a secondary base station or cell.

FIG. 6 is a flow diagram depicting the method steps associated with a UE determining a mode of operation based on whether or not bearers are mapped to a SeNB with which a random access procedure has taken place. Once a RA procedure has been carried out between the UE and SeNB, the UE can be considered to be connected to the SeNB. For a UE connected to an SeNB, a mode of operation of the UE may be determined based on whether any bearers are mapped to the SeNB.

At step 601 of FIG. 6, a SeNB may be added to a UE. It will be appreciated that in some embodiments step 601 may correspond to steps 501 to 505 of FIG. 5, however it will be appreciated that a SeNB may be considered to be successfully added to a UE when a random access procedure has been carried out between the UE and the SeNB.

At step 602, it is determined whether any bearers are mapped to the SeNB. It will be appreciated that this determination may be made by the UE in dependence on information received about the SeNB in the RRC reconfiguration message from the MeNB. If it is determined that bearers are mapped to the SeNB, then the method proceeds to step 603 where the UE goes into a full listening mode. It will be appreciated that in some embodiments, this full listening mode may correspond to steps 510 to 513 of FIG. 5 and may include both the monitoring or listening to of the PDCCH as well as uplink transmissions made on the PUCCH while waiting for the scheduling of user data.

If however, if it is determined that no bearers have been mapped to the SeNB then the method may proceed to step 604 where the UE goes into a limited listening mode. In some embodiments the limited listening mode may reduce the amount of time spent by the UE listening to the PDCCH and may limit uplink transmissions from the UE to those relating to the acquisition and generating of timing information such as timing advance information.

Steps 604 and 603 both proceed to the determining of whether bearers have been mapped to the SeNB. It will thus be appreciated that on the presence of a bearer, for example a bearer being mapped to the SeNB, a UE in the limiting listening mode will exit that mode and start operating in the full listening mode. A UE in full listening mode, on the determination that bearers are no longer mapped to the SeNB, for example on release of the last bearer for the SeNB, may exit the full listening mode and go into a limited listening mode 604.

In the second mode (when no bearers are mapped) the listening time to a downlink channel may be limited. In a first embodiment, this listening time may be limited by having the UE only listen to the downlink channel at a specific time for a timing information update. In this case, when a SeNB is added, the UE may not listen to the downlink channel. At some point, the UE may send a request for updated timing information to the SeNB and may listen to the downlink channel for a number of subframes in order to receive a response to this request. After receiving the response, the UE may cease listening to the downlink channel.

In the second mode in this example, the SeNB may reserve only the uplink resources used to send the request for timing information for the UE. For example, the SeNB may reserve a PUCCH-CQI or a PUCCH-SR. Fewer resources may be used when no bearers are mapped to the SeNB.

Figure 7:
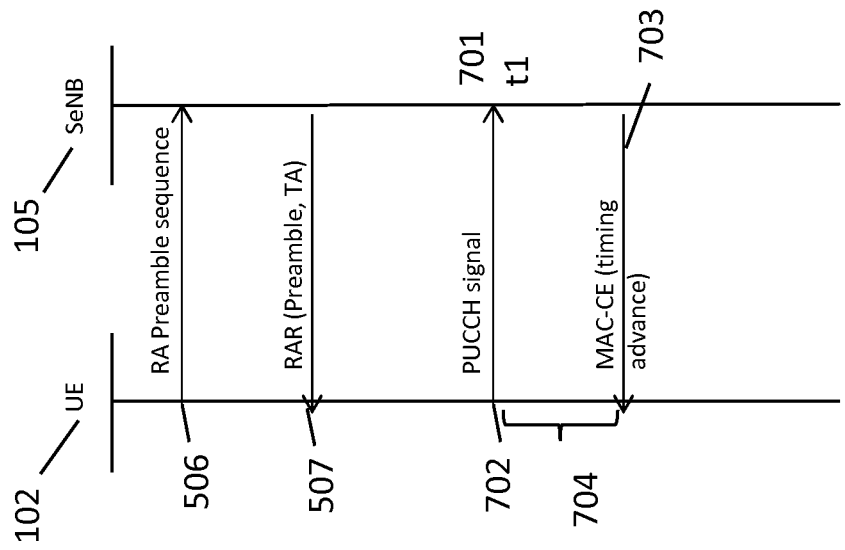
FIG. 7 is a flow diagram showing an example of the method steps that may be carried according to a first embodiment of a limited listening mode.
Figure 8:
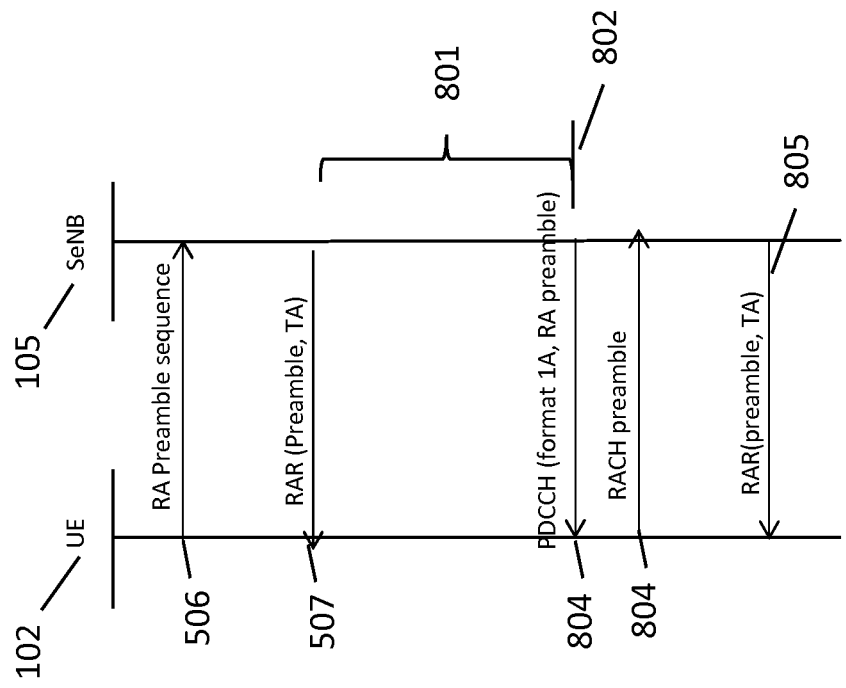
FIG. 8 is a flow diagram showing an example of the method steps that may be carried according to a second embodiment of a limited listening mode.

FIG. 7 shows a first embodiment of the limited listing mode 604 and FIG. 8 shows a second example of the limited listening mode 604. It will be appreciated that while the MeNB and S-GW have been omitted from FIGS. 7 and 8, they may be present in some embodiments. It will also be appreciated that while these figures show part of the random access procedure, in some embodiments, the signalling may include some or all of the signalling 501 to 505 in FIG. 5.

FIG. 7 shows the signalling between the UE 102 and the SeNB 105 in a case where no bearers are mapped to the SeNB. In this case, when the SeNB 105 is added to the UE 102, an uplink resource (for example a PUCCH) resource is reserved for the UE 102. The reserved resource may be a dedicated resource for the UE 102 to transmit uplink information such as for example a PUCCH for periodic channel quality indicator (CQI) or PUCCH for a scheduling request (SR) transmission.

In a first example, the PUCCH resource (CQI or SR) may be reserved specifically for a UE and be a dedicated resource for that UE. This allows the UE to have uplink access to the SeNB to send timing information requests. In another example, the PUCCH resource may not be dedicated exclusively to one UE. In this example the PUCCH Resource can be assigned or reserved for multiple UEs in time multiplexed manner. In this example, the UE may be able to send at least one uplink channel signal. The uplink (or PUCCH) resources may be time-shared among UEs and this may converse resources.

At step 506, the UE 102 may send a random access preamble to the SeNB 105 to initiate a random access procedure with the SeNB. It will be appreciated that this may be in response to an RRC reconfiguration message from the MeNB. The SeNB may send a random access response message (RAR) comprising the preamble and a timing advance. The timing advance may provide timing information to the UE 102 which may be used for the transmission of uplink data.

The timing information, for example a timing advance, is used by UE to adjust the uplink time for every uplink transmission in such a way that the uplink data is arrived exactly at time boundary. The value of the timing information is determined in dependence on the distance of the UE from the MeNB and/or SeNB and the propagation path.

In response to receiving the timing information, the UE may adjust its uplink transmission timing. The timing information may be requested from the SeNB to adjust UE retransmission timing and receive the signals correctly.

In embodiments, a determination may be made as to whether there are any bearers mapped to the SeNB. This determination may for example be based on the SeNB configuration information not comprising bearer information or for example no bearers being present. If no bearers are mapped to the SeNB the UE may operate in a limited listening mode. In the first embodiment, the limiting listening mode may comprise the UE not monitoring or listening to the PDCCH at all in response to the random access procedure.

The UE may comprise a timing alignment timer. The timing alignment timer may operate in accordance with the timing information, for example the timing advance, and may indicate a period of time for which the timing information is valid. During the random access procedure, timing between the UE and the SeNB may have been aligned for example through receipt of timing information However due to the clocks of the SeNB and the UE not being completely in synch, the timing may become progressive more misaligned. The timing alignment timer may indicate a period of time for which the timing of the UE and the SeNB may be considered to be aligned. Even though the UE is not listening to the PDCCH for scheduling of user data, the UE may carry out listening and receive signalling for keeping the timing aligned. In the first embodiment, the listening period of the UE may be activated in response to the UE sending an uplink signal to request updated timing information and may last for some specific duration or "listening window".

In this case, at a predetermined number of sub frames before the expiration of the timing alignment timer (at time $t_1$), the UE may transmit on the reserved PUCCH resource. This may be for example a PUCCH-CQI or for example a PUCCH-SR or it can be assigned via separate configuration where same resource is assigned to multiple UEs in time multiplexed manner The predetermined number of sub-frames may correspond to the amount time for the SeNB to receive the uplink transmission, estimation a new timing advance and provide the timing advance to the UE.

In response to receiving an uplink transmission on the PUCCH resource, the SeNB may calculate a timing advance (TA). The SeNB may send the estimated timing advance value to the UE via downlink media access control (MAC)—control element (CE) at 703.

The UE may be configured to listen to the PDCCH for a preconfigured number of frames 704 after sending the uplink signal on the PUCCH. In other words, the UE may be configured to listen specifically for the timing advance value from the SeNB and then cease listening again.

In some examples, the SeNB 105 may detect that the timing advance (TA) estimation is same as that of earlier value of TA. In this case, instead of sending MAC-CE, the SeNB 105 may send a PDCCH format 1A with preamble information set to some default value. The UE, on reception of a PDCCH with DCI Format 1A with preamble information during the time period 704, may consider that the TA is not changed and ignore the preamble info. In some embodiments this mechanism may save the additional PDSCH resource allocation just for sending the same TA value again to UE 102.

It will be appreciated that, as described with reference to FIG. 6, the UE may move between full listening mode and the limited listening mode as described in FIG. 7. For example, on the addition of a first bearer to the SeNB 105, the UE may switch to continue listening and for example follow a regular DRX configuration. The radio link monitoring of PSCell may continue based on PDCCH reception received in response to PUCCH-CQI.

It will also be appreciated that the UE 102 may move out of full listening mode and into the limited listening mode of FIG. 7. For example, on the release of a last bearer of the SeNB, the UE 102 may go into a limited listening mode in accordance with signals 701 to 704 of FIG. 7.

FIG. 8 shows a second embodiment of a limited listening mode of the UE 102. In this embodiment, instead of not monitoring or listening to the PDCCH at all like in the first embodiment, the UE 102 may go into a long discontinuous reception mode (DRX) in response to the first RA procedure towards UE, for example immediately after the first RA procedure. The long DRX cycle may have a long OFF cycle 801 followed by an ON cycle.

FIG. 8 shows the random access procedure steps 506 and 507. It will be appreciated that these steps may be similar to the steps 506 and 507 of FIGS. 5 and 7. It will also be appreciated that the embodiment of FIG. 8 may include some or all of the method steps 501 to 505.

In the second mode (when no bearers are mapped) the listening time to a downlink channel may be limited. In a second embodiment, this listening time may be limited by having the UE go into a discontinuous reception (DRX) mode. In this mode, the UE will go through a DRX off/DRX on cycle in which it will not listen for a period of time and then listen for a period of time.

In the second mode, the SeNB may not reserve any uplink resources for the UE. The SeNB may monitor a period of time for which the timing information at the UE is valid and the SeNB may be aware of when the UE is in an off cycle and when the UE is in an on cycle. If the SeNB determines that the period of time has ended, it will trigger a random access procedure in the UE next on cycle. The SeNB may then send updated timing information to the UE as part of a random access response message.

In the second embodiment of limited listening mode, after the receipt of the random access response (RAR 507), the UE 102 may go into a long DRX mode. For example, the UE 102 may switch to long DRX configuration immediately after contention resolution 509 on RACH access for SeNB, however, it will be appreciated that in some cases, the RA sequence may stop with reception of the RAR 507 itself.

The long DRX mode cycle may start with the UE 102 being in the DRX OFF cycle 801. The SeNB 105 may be aware of the DRX mode and cycle timings. At the end 802 of the OFF cycle 801, the SeNB may determine whether a timing alignment timer has expired. It will be appreciated that the timing alignment timer may be similar to that described with reference to FIG. 7.

If the OFF cycle has ended and the TA timer has expired, the SeNB 105 may trigger an uplink random access of the UE by sending a message 803 to the UE 102 comprising a random access channel (RACH) preamble. The message may be in some examples a PDCCH (Format 1A) message and is sent during the UEs 102 ON cycle. The UE 102 may respond with a RACH preamble at 804. The SeNB 105 may respond to this by providing a random access response (RAR) 805 which comprises a new timing advance (TA).

It can be seen that in the second embodiment, when the TA timer expires and the UE 102 is in a DRX ON cycle, the SeNB may trigger a random access procedure and provide a new timing alignment value as part of a random access response message during the random access procedure. If TA timer is not expired no activity is triggered from SeNB.

It will be appreciated that, as described with reference to FIG. 6, the UE may move between full listening mode and the limited listening mode as described in FIG. 8. For example, on the addition of a first bearer to the SeNB 105, the UE may switch to continue listening. In this case, the SeNB may optionally include random access related information only if the uplink time alignment status at SeNB indicates that time alignment is needed.

It will also be appreciated that the UE 102 may move out of full listening mode and into the limited listening mode of FIG. 8. For example, on the release of a last bearer of the SeNB, the UE 102 may go into a long DRX mode.

In the foregoing, the configuration of the UE and the SeNB for dual connectivity is described as being carried out by the MeNB. However, in further embodiment, the UE may be capable of autonomous mobility. In autonomous mobility, the UE may be configured to select a secondary cell (SCell) or SeNB with which to initiate dual connectivity.

Figure 9:
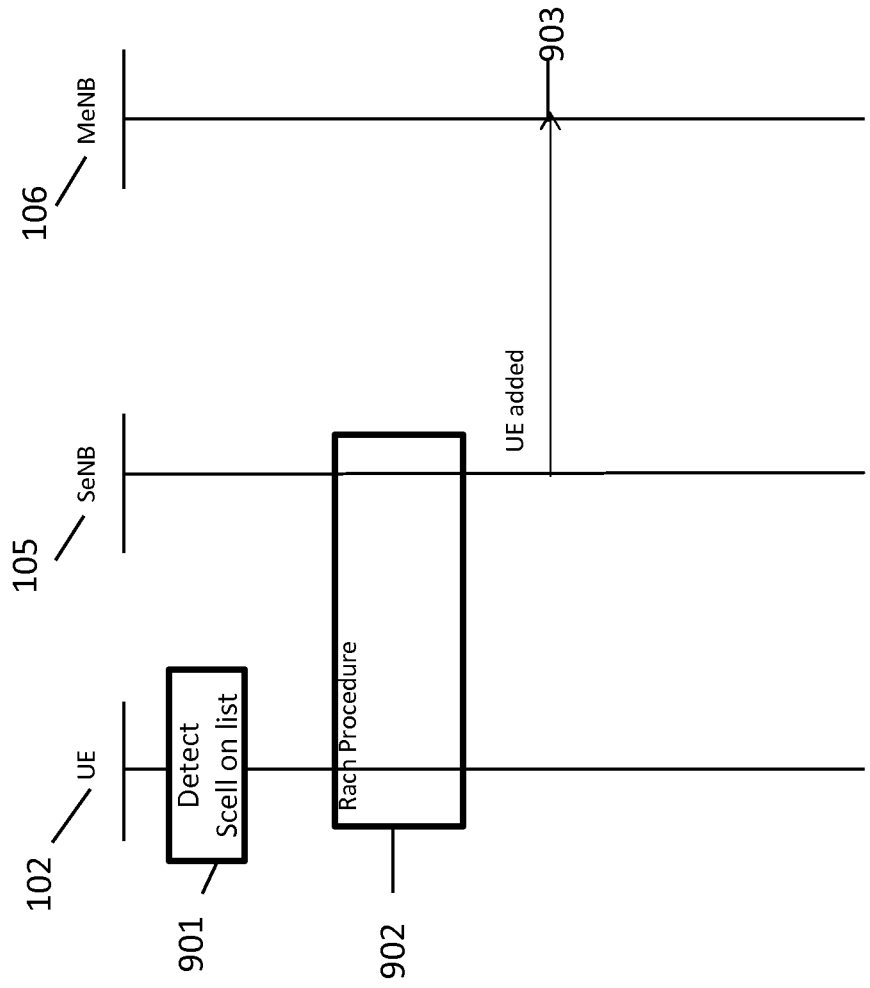
FIG. 9 is a flow diagram showing an example of the method steps that may be carried according to a further embodiment.

An example of autonomous mobility of the UE according to embodiment is shown in FIG. 9 showing signalling between the UE 102, SeNB 105 and MeNB 106.

In such autonomous mobility, the UE may be preconfigured with a list of SCells (cells of a SeNB) with which the UE may carry out dual connectivity. The UE may carry out measurements and detect a secondary cell that is suitable for dual connectivity and is on its preconfigured list at step 901. In this case, the UE 102 may select the detected cell by triggering a RA procedure with the new cell.

Once the random access procedure 902 has been carried out, for example on the reception of a contention resolution message from the new cell, the SeNB serving the cell may send a message 903 to the MeNB 106, informing the MeNB that the UE has added the SeNB 105. The MeNB may for example respond by switching the downlink user-plane path (if there are bearers mapped to the SeNB) without further configuration messaging towards UE.

In the case where the SeNB is added to the UE without bearers, the preconfiguration information provided to the UE may include only the SeNB configuration and a dedicated uplink resource to be used in a limited listening mode of the UE. For example in the first embodiment of the limited listening mode, the SeNB configuration information may include a PUCCH CQI resource and in the second embodiment of limited listening mode of the UE, the configuration information may include a C-RNTI only. The dedicated resources (for example PUCCH and/or PDCCH resources) that are required for dual connectivity may later be configured as part of the bearer addition.

In this case where bearers were mapped to the SeNB and then are released, on release of last bearer, the UE and SeNB may release the dedicated resources used for the bearer other than the C-RNTI and/or PUCCH-CQI.

In general, when the SeNB is added without bearers the SeNB configuration towards UE need to contain only common-configuration and only limited UE specific (dedicated) configuration freeing the dedicated resource as much as possible for this mode.

In autonomous mobility, the UE may have a list of secondary cells (served by the SeNB) that may be potential candidates for dual connectivity. The UE may additionally store configuration information associated with the secondary cells. The configuration information may comprise the configuration required to add a secondary cell without mapped bearers. For example the configuration information may comprise a general configuration for the secondary cell as well as a limited dedicated configuration. The dedicated configuration may be configuration information specific to a UE and may be limited with respect to information required to add a cell with bearers. In other words, the dedicated configuration information for a cell may comprise only information required to add the cell without bearers, for example limited uplink resources. Dedicated configuration to add a cell with bearers would comprise more configuration information than the dedicated information to add a cell without bearers as more uplink and/or downlink resource would be reserved for the UE. The configuration information (general and dedicated) may be provided to the UE in advance of the selection and addition of a cell. In some examples, the minimum configuration required to execute the limited mode listening may be sent to UE in advance to UE via a RRC-Reconfiguration for multiple secondary cells (for example the secondary cells for which mobility is more frequent). In autonomous mobility the UE may execute a random access procedure without direction from MeNB and continue its limited mode (second mode) listening.

Two examples will now be given of the use of embodiments. In a first example, a UE may be mobile and in the second example, the UE may be temporarily or permanently substantively stationary.

In a first example a UE may be connected to a MeNB. It may be determined (for example due to network policy or other determination) that the user equipment will offload certain types of bearers to a SeNB. For example, it may be determined that video calls or VoLTE calls may be offloaded to a SeNB.

The UE may make measurements of neighbouring cells and providing this measurement information in a measurement report to the MeNB. In example in which the UE is in an LTE system for example, the measurement report may be an A4 event measurement report which may report a neighbouring cell when measurements of that cell exceed a certain threshold. The UE may for example measure a first cell (served by the SeNB) and report this in the measurement report when the first cells measurements exceed a threshold. If subsequent measurements of the first cell drop below the threshold, the UE may remove this cell from the next measurement report.

In embodiments, when a cell (such as the first cell) has been identified, the UE may report the first cell and the first cell may be added to the UE even though no bearers are mapped to the first cell. The first cell may be added by the MeNB configuring a secondary cell group served by the SeNB and the UE may connect to a primary secondary cell (PSCell) of this group. When a bearer is available to be mapped to the SeNB (or first cell), for example when the UE is used to make or receive a video call, then the bearer may be mapped to the first cell without having to first undergo a connection procedure.

If, for example, the first cell is not added to the UE when it is detected, but rather only when a bearer is available to be mapped to the first cell, then a number of other measurement reports may take place between the detecting of the first cell and the mapping of the bearers. For example, the first cell may fall below the measurement threshold and be removed. The A4 report may be limited in the type of mobility event it may report and the first cell may be removed unnecessarily.

Adding the first cell on detection may for example, allow a more accurate judge on the mobility events of the UE with respect to the first cell because they are connect and intra-frequency measurements need not be relied on for information about the first cell.

In the second example, the UE may be stationary. The UE may be in dual connection with a MeNB and a SeNB. The UE may for example offload video call bearers to the SeNB. When the call ends (the bearers are released) the UE according to embodiments may remain connected to the SeNB. The SeNB in this case may release some or all of the uplink resources associated with the UE. However, when new bearers are mapped (for example another video call) the SeNB will be available for the UE without having to reconnect to the SeNB.

If the SeNB was not added (or remained added) to the UE even though the last bearer was released, the MeNB and UE would release the SeNB at the end of the video call. The UE would then provide another measurement report to the MeNB to indicate that the SeNB is a candidate for offloading. If another video call occurred between the release of the SeNB but before the measurement report, the MeNB would not have any suitable candidates for offloading. The MeNB may then in some examples support the video call and a SeNB is identified, at which point it would offload the call to the SeNB.

In the foregoing the SeNB has been described as reserving uplink resources. It will be appreciated that in some embodiments these uplink resources are uplink resources of a physical uplink control channel between the UE and the SeNB. The UE is described as listening to a downlink channel. It will be appreciated that in some embodiments this downlink channel may be a physical downlink control channel.

It will be appreciated that the foregoing has referred to a master base station and a secondary base station. It will be appreciated that each base station or access node may support a number of cells. In the case of the secondary base station these cells are called secondary cells (SCells) and form part of a secondary cell group (SCG). Similarly the MeNB may support a primary cell and secondary cells (SCells) forming part of a master cell group.

One of the secondary cells in SCG is a primary secondary cell (PSCell) and may carry out extended functionality to the secondary cells of the SCG. While the secondary cells are provided for the transmission and reception of the user data, the PSCell may carry control functions for the SCG. For example the PUCCH and PDCCH as well as TA information may all be carried out in relation to the PSCell. It will be appreciated that in the foregoing messaging is described as being to and from the SeNB, however in some embodiments, this messaging may be towards the PSCell. It will be appreciated that the UE may be in dual connectivity with one or more of the SCells and may communicate with the PSCell when it comes to the random access procedure.

When a SCell (served by the SeNB) is added to the UE without bearers by default, in some examples a primary secondary cell (PSCell) of a SCG is added. In this case, it is a PSCell that is added. The UE may go into a second mode of operation (limited listening) on the configuration and activation of the PSCell without bearers. Additional SCells (served by the SeNB) may be configured if needed. In one example, additional SCells are configured along with PSCell but activated later on bearer mapping only.

In some embodiments, the MeNB may configure a secondary cell group (SCG) served by a SeNB where there are no bearers mapped to the SCG or SeNB. The MeNB may also retain the configuration of the SCG after release of the last bearers mapped to the SCG. When the MeNB has configured such a SCG, the UE may activate a primary secondary cell (PSCell) supported by the SeNB. This activation may be seen for example by steps 501 to 505 of the figures. When the PSCell is configured without any mapped bearers the SeNB (supported the PSCell) and the UE may operate in the second mode. The MeNB may in some embodiments add bearers to the SCG without additional RACH-Access.

It is noted herein that while the above describes exemplifying embodiments of the invention, there are several variations and modifications which may be made to the disclosed solution without departing from the scope of the present invention.

It will be appreciated while the foregoing describes bearers, in some embodiments these may be data resource bearers (DRB) and may be between an access node or base station and a user equipment.

It will be appreciated that while the foregoing uses the term base station, it will be appreciated that the base station may be a network node to provide access to an user equipment to a network. The base station may be a node B, eNode B and/or a base transceiver station in some embodiments. Some embodiments have been described in relation to LTE in which case the base station will be an eNode B.

It will be appreciated that while the foregoing uses the term user equipment, it will be appreciated that the user equipment may be any communication device for accesses a network. A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

The required data processing apparatus and functions of a base station apparatus, a communication device or user equipment and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of the communication device, such as in the processor entity, or by hardware, or by a combination of software and hardware.

The applicant draws attention to the fact that the present disclosure may include any feature or combination of features disclosed herein either implicitly or explicitly or any generalisation thereof, without limitation to the scope of any definitions set out above. In addition to the modifications explicitly mentioned above, it will be evident to a person skilled in the art that various other modifications of the described embodiment may be made within the scope of the invention.

The invention claimed is:

1. A method, comprising:
   determining a mode of operation of a user equipment in dependence of the presence of bearers mapped to a secondary access node;
   operating in a first mode when it is determined that one or more bearers are mapped to the secondary access node;
   operating in a second mode when it is determined that no bearers are mapped to the secondary access node;
   wherein the second mode comprises limiting a listening time to a downlink channel from the secondary access node with respect to the first mode, and
   wherein the second mode comprises limiting the use of uplink resources to the secondary access node to a procedure for updating timing information, wherein the timing information comprises a timing advance between the secondary access node and the user equipment;
   carrying out dual connectivity with the secondary access node according to the determined mode;
   determining a time period for which the timing information is valid;
   sending a timing information update request on an uplink resource before the expiration of the time period, wherein limiting the listening time comprises
   limiting the listening time to a number of sub-frames after the timing information update request has been transmitted.

2. The method of claim 1, further comprising:
   limiting the use of uplink resources to the secondary access node in the second mode with respect to the first mode.

3. An apparatus comprising at least one processor and at least one memory including a computer program code, wherein the at least one memory and the computer program code are configured, with the at least one processor, to cause the apparatus at least to:
   determine a mode of operation of a user equipment in dependence of the presence of bearers mapped to a secondary access node;
   operate in a first mode when it is determined that one or more bearers are mapped to the secondary access node;
   operate in a second mode when it is determined that no bearers are mapped to the secondary access node;
   wherein the second mode comprises limiting a listening time to a downlink channel from the secondary access node with respect to the first mode, and
   wherein the second mode comprises limiting the use of uplink resources to the secondary access node to a procedure for updating timing information, wherein the timing information comprises a timing advance between the secondary access node and the user equipment;
   carry out dual connectivity with the secondary access node according to the determined mode;
   determine a time period for which the timing information is valid;
   send a timing information update request on an uplink resource before the expiration of the time period, wherein limiting the listening time comprises
   limiting the listening time to a number of sub-frames after the timing information update request has been transmitted.

4. The apparatus of claim 3, wherein the at least one memory and the computer program code are configured, with the at least one processor, to further cause the apparatus at least to:
   limit the use of uplink resources to the secondary access node in the second mode with respect to the first mode.

5. The apparatus of claim 3, wherein the at least one memory and the computer program code are configured, with the at least one processor, to further cause the apparatus at least to:
   limit the listening time based on a long discontinuous reception mode.

6. The apparatus of claim 5, wherein the at least one memory and the computer program code are configured, with the at least one processor, to further cause the apparatus at least to:
   initiate a random access procedure to update the timing information.

7. The apparatus of claim 6, wherein the at least one memory and the computer program code are configured, with the at least one processor, to further cause the apparatus at least to:
   receive a random access response message comprising the updated timing information.

8. An apparatus comprising at least one processor and at least one memory including a computer program code, wherein the at least one memory and the computer program code are configured, with the at least one processor, to cause the apparatus at least to:
   determine a mode of operation of a secondary access node in dependence of the presence of bearers mapped to the secondary access node;
   operate in a first mode when it is determined that one or more bearers are mapped to the secondary access node;
   operate in a second mode when it is determined that no bearers are mapped to the secondary access node;
   wherein the second mode comprises limiting the uplink resources reserved for a user equipment with respect to the first mode, and
   wherein the second mode comprises limiting the use of uplink resources to the secondary access node to a procedure for updating timing information, wherein the timing information comprises a timing advance between the secondary access node and the user equipment;
   carrying out dual connectivity with the user equipment according to the determined mode;
   follow a random access procedure when it is determined that the user equipment is in an on-cycle of a long discontinuation reception mode and that the period of time for which the timing information is valid has ended; and
   send a random access response comprising timing information to the user equipment.

9. The apparatus of claim 8, wherein the uplink resources are limited to uplink resources used in the procedure for updating timing information.

10. The apparatus of claim 8, wherein the reservation of the uplink resources is limited to an uplink resource for a request for updated timing information.

11. The apparatus of claim 10, wherein the at least one memory and the computer program code are configured, with the at least one processor, to further cause the apparatus at least to:
    receive a timing information update request on the reserved uplink resource.

12. The apparatus of claim 11, wherein the at least one memory and the computer program code are configured, with the at least one processor, to further cause the apparatus at least to:

estimate updated timing information in response to the timing information update request.

13. The apparatus of claim 11, wherein the at least one memory and the computer program code are configured, with the at least one processor, to further cause the apparatus at least to:

send a response to the timing information update request.

14. The apparatus of claim 8, wherein no uplink resources are reserved for the user equipment.

* * * * *